(12) United States Patent
Berube et al.

(10) Patent No.: US 7,811,375 B2
(45) Date of Patent: Oct. 12, 2010

(54) PIGMENT

(75) Inventors: Richard R. Berube, Holmdel, NJ (US); Mats F. Idvall, Haarlem (NL); Andrew R. Negele, Cape Elizabeth, ME (US); Ivan Petrovic, Princeton, NJ (US); Scott A. Hedrick, Piscataway, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 11/332,898

(22) Filed: Jan. 17, 2006

(65) Prior Publication Data

US 2006/0157212 A1 Jul. 20, 2006

Related U.S. Application Data

(60) Provisional application No. 60/644,386, filed on Jan. 14, 2005.

(51) Int. Cl.
C09C 1/36 (2006.01)
C04B 14/00 (2006.01)
C04B 14/04 (2006.01)

(52) U.S. Cl. ............... 106/420; 106/486; 106/447

(58) Field of Classification Search ........... 106/400, 106/420, 486, 447
See application file for complete search history.

(56) References Cited

U.S. PATENT DOCUMENTS

| 3,586,523 | A | | 6/1971 | Fanselow | |
|---|---|---|---|---|---|
| 4,196,012 | A | * | 4/1980 | Windle | 106/157.71 |
| 5,011,534 | A | * | 4/1991 | Berube et al. | 106/416 |
| 5,232,881 | A | * | 8/1993 | Wu | 501/148 |
| 5,338,354 | A | * | 8/1994 | Melville et al. | 106/442 |
| 6,346,145 | B1 | * | 2/2002 | Hen et al. | 106/486 |
| 6,709,764 | B1 | * | 3/2004 | Perrin et al. | 428/537.5 |
| 6,890,652 | B2 | * | 5/2005 | Schulz | 428/402 |

FOREIGN PATENT DOCUMENTS

| GB | 1198599 | * | 3/1969 |
| GB | 2234990 | | 2/1991 |
| GB | 2234990 A | * | 2/1991 |
| WO | WO 00/32700 | | 6/2000 |
| WO | WO0032700 | * | 6/2000 |

OTHER PUBLICATIONS

EXCALIBER® Engelhard Corporation Product Brochure (published 2002).
Kaolinbasierende Systeme zur Erhohung der Opazitat von Papieren, by C. Kohl and R. Berube, Wochenblatt fur Papierfabrikation, Nov. 2004, pp. 1400-1403.
US06/001644 PCT Search Rp, Feb. 21, 2007, Engelhard Corporation.
Chinese Office Action for 200680002416.0 mailed on Jan. 8, 2010.
European Office Action for 06 718 681.7 mailed on Mar. 9, 2010.
I. R. Wilson, Kaolin and halloysite deposits of China, Clay Minerals, vol. 39, 2004, pp. 1-15.

* cited by examiner

*Primary Examiner*—Jerry Lorengo
*Assistant Examiner*—Shuangyi Abu Ali
(74) *Attorney, Agent, or Firm*—Bernard Lau

(57) ABSTRACT

A heated mixture comprising dehydroxylated kaolin and a high refractive index pigment is disclosed. When the dehydroxylated kaolin is metakaolin, the heated mixture has a GE brightness greater than 86% and a Hunter yellowness index of less than about 11. When the dehydroxylated kaolin is fully calcined kaolin, the heated mixture has a GE brightness greater than 89%. The heated mixture is advantageously used in decorative paper.

Also disclosed are methods of using and making the decorative paper, and decorative laminates containing the decorative paper.

20 Claims, No Drawings

PIGMENT

This patent application claims the benefit of pending Ser. No. 60/644,386 filed Jan. 14, 2005 incorporated in its entirety herein.

TECHNICAL FIELD

The subject technology generally relates to pigments, decorative paper, products containing the decorative paper, and methods of making and using the decorative paper. In particular, the subject technology relates to decorative paper with a unique opacity filler composed of heated mixture of dehydroxylated kaolin and a high refractive index pigment.

BACKGROUND

Some papers classified as decorative papers are used to make decorative laminates. The top sheets of paper in decorative laminates may or may not be printed with a decorative pattern either before or after being saturated (or impregnated) with resin and then they are laminated under elevated pressures and temperatures onto a variety of substrates from paper to composites and wood. Decorative laminates are often used to simulate wood grains and other designs and used in the manufacture of floors, furniture etc. An exemplary product is referred to as Formica.

In such products, the saturated decorative paper (the top sheet) must have enough opacity (hiding power) to cover and hide the dark substrate underneath so that the dark substrate does not interfere with the aesthetics of the printed pattern. However, since the decorative paper is saturated with materials that are similar in refractive index to the paper fiber, the saturated paper is transparent unless it contains fillers such as titanium dioxide that have a higher refractive index. High refractive index fillers are expensive; therefore, less expensive fillers are used to extend the titanium dioxide. These might include kaolin fillers, special talcs and calcined kaolin. The black glass scattering coefficient of a commercially available calcined kaolin is 0.284 $m^2/g$ at 457 nm. And since a substantial amount of decorative papers to be laminated are used in laminates that are white or off-white in color, a high degree of brightness and whiteness are also desired.

The Engelhard product brochure on EXCALIBER® high opacity kaolin-based pigment (published 2002) teaches that this product having a GE brightness of 83% or less can be used in paper applications that do not require high brightness. For example it has been used in Lightweight Coated Paper (LWC) and decorative laminates.

International Publication Number WO 00/32700 teaches a heated mixture of 90% metakaolin and 10% anatase titanium dioxide (Kronos 1000 from Kronos Inc.) which can be used as a filler and coating pigment. The reported GE brightness for this heated mixture is 85.2.

International Publication Number WO 00/32700 teaches a pigment of a heated mixture of 90% hydrous kaolin and 10% rutile titanium dioxide (RCS VANTAGE from DuPont) which can be used as a filler and coating pigment. As shown in Preparation A below, a heated mixture of 89.5% hydrous kaolin and 10.5% rutile titanium dioxide has a GE brightness of 81.3% and a Hunter yellowness index of 11.60. Although we understand that a mixture similar to the Preparation A mixture has been used in a décor paper that was sold, such a mixture is undesirable in white grades of décor paper because it results in low brightness, poor whiteness and yellow appearance.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

We have discovered a heated mixture comprising dehydroxylated kaolin and a high refractive index pigment. When the dehydroxylated kaolin is metakaolin, the heated mixture has a GE brightness greater than 86% and a Hunter yellowness index of less than 11.

The present pigment may be used in the manufacture of a decorative paper that allows the paper producer to replace some proportion of more expensive fillers such as titanium dioxide with a less expensive pigment yet maintain the advantageous optical properties that expensive fillers normally provide. The present pigment with a lower refractive index than titanium dioxide may be substituted up to about 60% of the titanium dioxide while maintaining the opacity, brightness, and whiteness normally associated with the higher refractive index of titanium dioxide.

One aspect of the present pigment relates to decorative paper containing a fiber and a high performance pigment system containing specified amounts of rutile or anatase titanium dioxide and specified amounts of a heated mixture containing dehydroxylated kaolin and a high refractive index pigment which provides the opacity needed to hide the backing onto which the decorative paper is laminated.

Another aspect of the invention relates to decorative laminates containing the decorative paper with its unique high performance pigment system, a backing substrate and a resin. Yet other aspects of the invention relate to methods of making and using the decorative paper, methods of making and using the decorative laminates, and methods of improving the hiding power of kaolin-based filler.

To the accomplishment of the foregoing and related ends, the invention comprises the features hereinafter fully described and particularly pointed out in the claims. The following description sets forth in detail certain illustrative aspects and implementations of the invention. These are indicative, however, of but a few of the various ways in which the principles of the invention may be employed. Other objects, advantages and novel features of the invention will become apparent from the following detailed description of the invention.

DETAILED DESCRIPTION

Heated Mixture:

The phrase "heated mixture" as used herein means that kaolin and a high refractive index pigment are first mixed together and then the mixture is heated.

The phrase "high refractive index pigment" means any pigment having a refractive index greater than about 1.8 and is selected from the group consisting of anatase titanium dioxide, zinc oxide, and lithopone.

Kaolin is a fine usually white clay formed by the weathering of aluminous minerals (as feldspar) and mainly consists of kaolinite. Kaolinite is commonly represented by one or more of the chemical formulae $Al_4Si_4O_{10}(OH)_8$; $Al_2O_3 \cdot 2SiO_2 \cdot 2H_2O$; and/or $Al_2Si_2O_5(OH)_4$. Reserves are found in Georgia (USA), Egypt, Brazil, United Kingdom, Queensland (Australia), Korea, Ukraine, and China. The hydrous kaolin of the subject invention is crude kaolin that is beneficiated. Examples of commercially available hydrous kaolin of the subject invention include those under the trade designations ASP®, ULTRA GLOSS® 90, ULTRA WHITE 90®, MIRAGLOSS™, ULTRA COTE®, and the like, available from Engelhard Corporation of Iselin, N.J. The refractive index of hydrous kaolin is about 1.56-1.58.

The hydrous kaolin of the subject invention has a GE brightness of about 70 or more. In another embodiment, the hydrous kaolin of the subject invention has a GE brightness of about 80 or more. In yet another embodiment, the hydrous kaolin of the subject invention has a GE brightness of about 88 or more. In still yet another embodiment, the hydrous kaolin of the subject invention has a GE brightness of about 90 or more.

The hydrous kaolin of the subject invention has a particle size distribution where at least about 90% by weight of the particles have a particle size of about 2 micrometers or less. In another embodiment, the hydrous kaolin of the subject invention has a particle size distribution where at least about 90% by weight of the particles have a particle size of about 1 micrometer or less. In yet another embodiment, the hydrous kaolin of the subject invention has a particle size distribution where at least about 80% by weight of the particles have a particle size of about 2 micrometers or less. In yet another embodiment, the hydrous kaolin of the subject invention has a particle size distribution where at least about 70% by weight of the particles have a particle size of about 2 micrometers or less.

The heated mixture contains from about 54% to about 99% by weight of dehydroxylated kaolin and from about 1% to about 46% by weight of high refractive index pigment (calculated on dry weight basis). The heated mixture contains from about 67% to about 99% by weight of dehydroxylated kaolin and from about 1% to about 33% by weight of high refractive index pigment (calculated on dry weight basis). The heated mixture contains from about 72% to about 98% by weight of dehydroxylated kaolin and from about 2% to about 28% by weight of high refractive index pigment (calculated on dry weight basis). The heated mixture contains from about 77% to about 95% by weight of dehydroxylated kaolin and from about 5% to about 23% by weight of high refractive index pigment (calculated on dry weight basis).

Either wet or dry mixing of hydrous kaolin and the high refractive index pigment can be performed. To facilitate making the heated mixture, a slurry of hydrous kaolin can be combined and blended with a slurry of the high refractive index pigment, or simply a slurry of hydrous kaolin and a high refractive index pigment can be made. The slurry is then spray dried to decrease free moisture to less than about 2% by weight, or even less than about 1% by weight. The dry material is then pulverized to break up and reduce the size of the spray-dried aggregates.

Heating involves subjecting the combination of materials to temperatures from about 760° C. to about 1150° C. for a time from about 10 seconds to about 20 hours. Heating within these conditions yields metakaolin, fully calcined kaolin, or mixtures thereof. In another embodiment, the combination of materials is heated to temperatures from about 815° C. to about 1090° C. for a time from about 1 minute to about 10 hours. In yet another embodiment, the combination of materials is heated to temperatures from about 840° C. to about 1070° C. for a time from about 10 minutes to about 5 hours. Exceeding temperatures of 1150° C. results in low brightness, high yellowness index and the formation of abrasive components that are undesirable in this application. Heating the kaolin results in dehydroxylated kaolin. It is also believed that the temperature used in the heating process alters the crystalline structure of the kaolin and causes the metal oxide to aggregate with the altered kaolin.

After heating, the mixture is pulverized to break up larger agglomerates and/or decrease the particle size distribution. The heated mixture has a particle size distribution where at least about 80% by weight of the particles have a particle size of about 10 microns or less. In another embodiment, the heated mixture containing has a particle size distribution where at least about 80% by weight of the particles have a particle size of about 5 microns or less.

In yet another embodiment, the heated mixture has a particle size distribution where at least about 60% by weight of the particles have a particle size of about 2 microns or less. In yet another embodiment, the heated mixture has a particle size distribution where at least about 70% by weight of the particles have a particle size of about 2 microns or less. In yet another embodiment, the heated mixture has a particle size distribution where at least about 80% by weight of the particles have a particle size of about 2 microns or less. In a preferred embodiment, the heated mixture has a particle size distribution where at least about 80% to about 90% by weight of the particles have a particle size of about 2 microns or less and less than about 5% by weight of the particles have a particle size of about 0.2 micron.

High Performance Pigment System:

The phrase "high performance pigment system" as used herein means from about 40% to about 99% by weight of a titanium dioxide normally used in this application and from about 1% to about 60% by weight of the heated mixture.

A high performance pigment system is necessary to maintain the opacity, brightness, and whiteness in décor paper after it has been saturated with resins and laminated under pressure and temperature onto another substrate or substrates.

In another embodiment, the high performance pigment system contains from about 70% to about 98% by weight of at least one of rutile titanium dioxide and anatase titanium dioxide and from about 2% to about 30% by weight of the inventive pigment. In yet another embodiment, the high performance pigment system contains from about 70% to about 95% by weight of at least one of rutile titanium dioxide and anatase titanium dioxide and from about 5% to about 30% by weight of the inventive pigment.

The high performance pigment system contains 1) at least one of rutile titanium dioxide and anatase titanium dioxide, and 2) the pigment of the invention. Since rutile and anatase titanium dioxide are relatively expensive, the combination of opacity components of the subject invention is markedly less expensive compared to using the same weight of titanium dioxide alone. The high performance pigment system may optionally contain other components that improve or contribute to the opacity properties of the high performance pigment system. The contribution of a given mineral pigment material has on opacity is dependent on its ability to scatter light and absorb light. The light-scattering ability of a mineral pigment material is generally related to two particle characteristics; namely, refractive index and particle size (and more specifically particle size distribution). For example, calcined kaolin has a refractive index of about 1.65.

Rutile titanium dioxide has a refractive index of about 2.7 and thus has the best hiding power of these compounds. Rutile titanium dioxide is the most thermodynamically stable titanium dioxide and has superior weather/wear resistant characteristics, which are particularly useful for decorative paper and decorative laminate applications. The rutile titanium dioxide of the high performance pigment system generally has a particle size distribution where at least about 100% by weight of the particles about 5 microns or less. In another embodiment, the rutile titanium dioxide of the high performance pigment system has a particle size distribution where at least about 95% by weight of the particles are about 1 micron or less. In yet another embodiment, the rutile titanium dioxide of the high performance pigment system has a particle size distribution where at least about 90% by weight of the particles are about 0.5 microns or less. Rutile titanium dioxide is commercially available from a number of sources.

The rutile titanium dioxide may or may not have a silica and/or alumina treatment or coating on its surface. In one embodiment, the rutile titanium dioxide contains a silica coating on its surface, where the silica coating is less than about 20% by weight of the rutile titanium dioxide. In another embodiment, the rutile titanium dioxide contains a silica coating on its surface, where the silica coating is less than about 10% by weight of the rutile titanium dioxide.

Anatase titanium dioxide has a refractive index of about 2.55. Anatase titanium dioxide of the high performance pigment system generally has a particle size distribution where at least about 90% by weight of the particles are about 5 microns or less. In another embodiment, the anatase titanium dioxide of the high performance pigment system has a particle size distribution where at least about 90% by weight of the particles are about 4 microns or less. In another embodiment, the anatase titanium dioxide of the high performance pigment system has a particle size distribution where at least about 90% by weight of the particles are about 3 microns or less. Anatase titanium dioxide is commercially available from a number of sources.

The high performance pigment system is then formed by combining the heated mixture and at least one of rutile titanium dioxide and anatase titanium dioxide.

Utility:

The present pigment may be advantageously used in the preparation of decorative paper. Decorative paper of the subject invention contains fiber, a high performance pigment system, and optionally one or more of a combination of dyes to control color, retention aids to improve the retention of fiber, pigments and dyes, and dry and/or wet strength resins to improve the strength of the paper. The decorative paper layer may be used to form a decorative laminate.

The decorative laminate contains the decorative paper which may be printed with a decorative pattern either before or after it is saturated with a clear resin (for instance urea or melamine formaldehyde or other appropriate resin), and a supporting or backing substrate which, depending on its composition, may or may not be saturated with the same or different resin as the decorative paper.

The high performance pigment system of the subject invention allows the producer of the decorative paper to use less of more expensive and higher refractive index titanium dioxide and thus more of a lower refractive index less expensive pigment, thereby reducing costs and maintaining all other paper properties to within normal, desirable parameters. The level of titanium dioxide substitution can be up to about 60% depending on the grade of décor paper being produced (white versus color grades; low pressure versus high pressure laminates) which is unexpected considering the difference in refractive index between titanium dioxide and the present heated mixture.

Decorative paper typically has at least two functional components: fiber to make the structure coherent and a high performance pigment system for opacity and aesthetic properties. Decorative paper may optionally have one or more additional layers and/or one or more additional components. In one embodiment, the decorative paper contains from about 45% to about 95% by weight of the fiber and from about 5% to about 55% by weight of the high performance pigment system. In another embodiment, the decorative paper contains from about 50% to about 90% by weight of the fiber and from about 10% to about 50% by weight of the high performance pigment system. In yet another embodiment, the decorative paper contains from about 55% to about 85% by weight of the fiber and from about 15% to about 45% by weight of the high performance pigment system. In yet another embodiment, the decorative paper contains from about 60% to about 85% by weight of the fiber and from about 15% to about 40% by weight of the high performance pigment system.

The paper used in the decorative paper layer is generally produced as a continuous sheet in roll form. That is, the decorative paper is in the form of pages, webs, ribbons, tapes, belts, films, cards and the like. Sheet form indicates that the decorative paper has two large surface dimensions and a comparatively small thickness dimension. The paper can be any of opaque, transparent, translucent, colored, and non-colored (white). Examples of fiber materials include paper pulp, paper fiber, cellulose fiber, bleached sulfate pulp, bleached sulfite pulp, filamentous synthetic materials, and synthetic polymeric fibers.

The identity of the fiber and the amount of fiber are of sufficient substance to support the high performance pigment system. In one embodiment, the decorative paper has a basis weight of about 20 g/m$^2$ (grams per square meter) or more and about 200 g/m$^2$ or less. In another embodiment, the decorative paper has a basis weight of about 30 g/m$^2$ or more and about 100 g/m$^2$ or less.

The high performance pigment system and fiber or pulp are then combined and processed to form the decorative paper layer. The fiber can either be produced by the paper mill (if the mill is integrated) or can be purchased from a pulp supplier in sheets (dry lap form). The fiber and pigments (including the high performance pigment system) are mixed together in a mixing unit such as a hydropulper. The pigments can be added dry to the fiber/water mixture or they can be first dispersed in water and then added to the fiber mix either in a hydropulper or similar device (like a beater), or in numerous locations as the mixture is transported to the paper machine (fan pump for example). The fiber, either before or after the addition of pigments, is refined between rotating discs, or rotating cones (disc refiners, Jordans etc.) which produce fibrils on the fibers responsible for paper strength. In addition to pigments the paper also contains other chemicals like retention aids to aid in the retention of the fiber and pigments, dry and wet strength additives to improve dry and wet strength etc. This mixture of water, fiber, pigments and chemicals is fed to the headbox and is transferred to a rotating wire where the paper is formed and the water removal process begins. Water is removed by drainage through the wire (or plastic fabric) mesh using a combination of gravity, and pressure (or vacuum devices) like foils, rolls, vacuum boxes etc. The paper is transferred from the rotating wire and pressed between felts to remove additional water and compress the pulp mix to aid in strength development. Next the paper is subjected to high temperature steam rolls to reduce the moisture level to within the mill specification (usually between 5 and 10% moisture). Once the decorative paper layer is made, it leaves the paper mill and may be transported to either a printer or directly to a laminator. If it goes to a printer, the printer prints a design on the paper (such as a faux wood finish, faux marble, faux granite or other faux stone).

The optionally printed decorative paper is then saturated with a clear resin and laminated under elevated temperatures and pressures to a backing substrate to produce a decorative laminate. The clear resin has sufficient strength to bind the decorative paper to the backing substrate, as well as impart durability, wear, scratch and heat resistance. Examples of clear resins include urea formaldehyde, melamine formaldehyde, polyesters, polyurethanes, polyamines, polyamides, melamines, phenols, polyacrylamides, and the like.

The decorative paper is contacted with the resin while the resin is in liquid or semi-liquid form using any suitable technique. Examples of contact include dipping, immersing, spraying, roll coating, reverse roll coating, using doctor blade, and the like.

The decorative paper is then contacted with the backing or supporting substrate. The backing substrate, before being laminated to the decorative paper, may also be contacted with a resin, although it is not necessary that this resin be clear and/or colorless. The backing substrate provides strength, bulk, shape, and/or structure to the resultant decorative laminate. Examples of backing substrates include paper, such as kraft paper, particleboard, cardboard, wood, plywood, chipboard, drywall materials, and the like. Paper backing substrates typically have a basis weight of about 10 $g/m^2$ or more and about 200 $g/m^2$ or less. In another embodiment, paper backing substrates typically have a basis weight of about 25 $g/m^2$ or more and about 100 $g/m^2$ or less. In instances where the backing substrate is paper, typically a plurality of paper sheets is employed to make a decorative laminate.

The decorative paper is contacted with the backing substrate under suitable pressure and suitable temperature for a suitable period of time, for example, in a press. In the press, the resin re-liquefies, flows, cures, and thus binds the components together. In one embodiment, the decorative paper is contacted with the backing substrate under pressure from about 50 to about 1,700 psi (pounds per square inch) and a temperature from about 40° C. to about 250° C. for a time from about 20 seconds to about 10 hours. In another embodiment, the decorative paper is contacted with the backing substrate under pressure from about 200 to about 1,500 psi and a temperature from about 50° C. to about 200° C. for a time from about 10 minutes to about 5 hours.

An advantage of the subject invention is that the high performance pigment system is markedly less expensive than using rutile or anatase titanium dioxide alone. Moreover, the decorative laminates containing the decorative paper, which in turn, contains the high performance pigment system have excellent hiding properties (ability to hide the backing substrates), high durability, wear resistance, scratch resistance, heat resistance, and are aesthetically pleasing.

The decorative laminate may contain other materials and/or layers, such as overlay sheets, barrier layers, and the like to improve the performance and/or to improve the fabrication of the decorative laminates.

The unique performance of this product in the decorative paper layer of decorative laminates should make this technology applicable in any paper application where titanium dioxide is utilized for example in coated board, uncoated and coated wood free papers, coated and uncoated wood containing papers (LWC for example), and specialties like wall paper and non-wovens.

Test Methods:

Particle Size Distribution—All particle sizes referred to herein are determined by a conventional sedimentation technique using a Micromeritics Instrument Corporation SEDIGRAPH® 5100 analyzer analysis. The Sedigraph 5100 determines particle size by using a gravity-induced sedimentation principle. The principle, which is based on spherical particles, says that when placed in a suspension with known properties, smaller particles settle at a slower rate than larger particles. The analyzer uses the settling velocity of the particles, the liquid density and viscosity, and the particle density to calculate the equivalent spherical diameter of particles.

Pigment Brightness—This method describes the procedure for preparing the pigment plaque for use in determining the GE brightness and the procedure for the brightness measurement.

A 1 inch high by 1⅛ inch inside diameter aluminum metal ring is placed onto a smooth, clean and scratch-free flat glass plate or glass mirror. The ring is filled to a depth of ½ inch with the dry pigment. A 1 1/16 inch diameter cylindrical brass metal plunger is positioned vertically over the center of the ring. While holding the ring firmly against the glass surface, the plunger is gently lowered into the ring carefully to avoid blowing fine pigment from the ring. Continue depressing the plunger to deliver 30 pounds per square inch. Release the pressure from the plunger, rotate it ¼ turn and then depress again. Slowly release the pressure and withdraw the plunger from the ring. The specimen plague will have been formed at the bottom of the ring. Leave the specimen plaque in place as prepared until time for measuring brightness.

When ready to test brightness, remove the ring from the glass by lifting it vertically. Invert the ring and inspect the plaque surface making certain it is free from surface irregularities, flaws or contamination. Test the brightness of the plaque immediately after separating it free from the glass surface.

The brightness of a specimen plaque is measured using a brightness instrument equipped with a filter having an effective wavelength of 457 nm and calibrated relative to magnesium oxide having a brightness value of 100%. The instrument described herein is a Brightimeter Model S4-M, which is manufactured by Technidyne Corporation, New Albany, Ind. 47150 USA.

To determine plaque brightness, place the center of the smooth surface of the specimen plaque over the aperture of the tester. Record the brightness value displayed on the instrument. Carefully lift the plaque and rotate it ¼ turn and release it over the aperture and record the brightness value.

The 2 brightness values are averaged and reported to 1 decimal place.

Pigment CIE Whiteness, Hunter L, a, b, and Yellowness Index—This method describes the procedure for preparing the pigment plaque used in determining the CIE whiteness, Hunter yellowness index, and Hunter L, a, b values of a pigment specimen and the method to measure these properties.

A 1 inch high by 1¾ inch inside diameter plastic ring is centered on a smooth, clean and scratch-free glass plate. The ring is filled to a depth of approximately 1¼ inches with a pigment specimen. A 1 11/16 inch diameter by 4 inch high cylindrical plastic plunger is positioned vertically over the center of the ring. While holding the ring firmly against the glass surface, lower to plunger gently being careful to avoid blowing the dry sample from the ring. Continue depressing the plunger with gradually increasing pressure, until 23 psi (+/−2 psi) are achieved and continue to hold at this pressure for 3 to 5 seconds. Slowly release the pressure and withdraw the plunger from the ring. Leave the ring in place as prepared until immediately prior to testing.

Separate the ring from the glass by lifting it vertically. Invert the ring and inspect the plaque surface making certain it is free from surface irregularities, flaws or contamination. Test the desired optical properties of the plaque immediately after separating it from the glass.

The whiteness and color of a specimen plaque is measured by a Technibrite Micro TB-1C tester (manufactured by Technidyne Corporation, New Albany, Ind. 47150 USA). The instrument employs diffuse illumination geometry.

CIE whiteness, Hunter yellowness index, and Hunter L, a, b color were selected from the list of optical parameters that are programmed in the instrument. Place the center of the smooth surface of the specimen plaque over the aperture of the tester. Follow the sequence of steps outlined in the instrument operations manual that is supplied with the instrument. The instrument provides instantaneous calculation of the optical properties in printout form.

Black glass scattering is described in Kaliski, A., TAPPI, Vol. 53, No. 11, November 1970, pages 2077-2084 titled "Performance of Some Clays in Starch Containing Paper-Coating Films; Part I. Black Glass Plates as Model Substrates". Generally speaking, for this invention black glass scattering is determined by applying a film of pigment onto optically smooth black glass from a 30% solids (by weight) mixture of pigment and water using a 0.25 mil Bird Bar. The reflectance values of the pigment films after air-drying are measured at wavelengths of 457 nm and 577 nm by means of a reflectance meter having an integrated sphere geometry like an Elrepho reflectometer. The reflectance values are converted by the use of Kubelka-Munk equations to light scattering coefficients ($m^2/g$). The light scattering coefficients give an indication of the opacifying potential of a pigment. Higher light scattering values are indicative of more light being reflected from the pigment film and less light passing through the film and absorbed by the black glass. Higher values are indicative of higher opacity and better hiding.

Paper Making Procedure—Three hundred grams of dry lap eucalyptus fiber was torn into 5 by 10 inch sections and soaked for 1 hour in 19.7 liters of de-ionized water. The fiber and water were then subjected to mixing using a double 3 blade impellor. The rotational speed was adjusted to create a moderate size vortex. After 10 minutes of stirring the pulp was transferred to a 1½ lb. Valley beater (manufactured by Voith Sulzer Papertechnology, Appleton, Wis.) and refined to 400 ml freeness (Canadian standard method). A 1486 gram portion of the 1.5% consistency refined pulp was transferred to a 3 U.S. gallons plastic bucket and stirred for 10 minutes by a Cowles type dissolver propeller rotating at a speed that resulted in a moderate size vortex. Immediately added were 1.83 grams of Navadin DHF solution (Lanxess Deutschland GmbH) then 29.7 grams of filler pigment. The furnish was diluted to 1% consistency by adding de-ionized water and mixed for 1 additional minute. Then 0.24 gram of EKA NP 422 (Akzo Nobel, Eka Chemicals AB, SE-445 80 Bohus, Sweden) was added and the furnish mixed for 30 seconds, then 1.8 grams of Navidin DHF was added and the furnish stirred for 3 minutes more.

This furnish mix was transferred to a Formax proportioner and diluted to 0.5% consistency with de-ionized water and stirred with a 3 bladed 1½ inch propeller. The Formax sheet mold (12×12 inches) was filled to ⅔ capacity with de-ionized water, then an amount of furnish required to produce an 80 $g/m^2$ hand sheet was added. The furnish was mixed by hand with a perforated paddle and the water was gravity drained from the furnish to form a hand sheet on a 150-mesh U.S. standard screen. The hand sheet was pressed by passing it through a Formax roll press and then it was dried in a Formax drum drier. The proportioner, sheet mold, roll press, and drum drier equipment were supplied by Adirondack Machine Corporation, Queensbury, N.Y. 12804 USA.

After the paper samples were prepared the optical properties were measured in accordance with the procedures previously described.

Paper Directional Brightness Determination—This test method describes the procedure used for measuring the brightness of paper. The instrument employs a 45° illumination and 0° viewing geometry. The instrument employed in this test is a Brightimeter Model S-4 brightness tester (manufactured by Technidyne Corporation, New Albany, Ind. 47150, USA).

The papers were conditioned for 24 hours at 72° F. and 50% relative humidity. A pad of test specimens was placed over the specimen aperture of the instrument with the side to be measured face down when in contact with the top of instrument. The pad should be completely opaque and comprised of the number of individual sheets required such that doubling the thickness does not change the measured reflectance. A 1 kg backing weight is placed on the pad. Record the reflectance reading displayed on the instrument. Move the lower paper sheet to the back of the pad. Nine different locations were measured on each sheet, with 3 locations equidistant across the top, middle, and bottom. Repeat this procedure until 3 sheets have been measured.

Percent brightness is reported as the arithmetic mean average. The value is reported to one decimal.

Paper Opacity Determination—This test measures the opacity of paper as a ratio of light reflected when backed by a black body over that reflected when backed by a white body. This value is the Contrast Ratio or Opacity and is defined as 100 times the diffuse reflectance of a single sheet backed with the black body, to the diffuse reflectance of the same sheet backed with the white body. The Technidyne Model BNL-3 Opacimeter was used to measure opacity.

The instrument employed was the Technidyne BNL-3 Opacimeter (supplied by Technidyne Corporation, New Albany, Ind. 47150, USA).

Paper specimens were conditioned for 24 hours at 72° F. and 50% relative humidity. Place the test specimen over the aperture of the opacimeter. Back the specimen with the white body that is attached to the instrument arm and depress the "white body" switch. A 100.0 digital readout will be displayed on the instrument. While keeping the test specimen in the exact same location on the aperture, place the black body over the test specimen. Record the digital readout as % opacity. Read 9 different locations, with 3 locations each equidistant across the top, middle, and bottom of each test sheet. Evaluate 3 test sheets for each sample. The felt side of the paper is placed toward the aperture.

Percent opacity is reported as the arithmetic mean average. The value is reported to one decimal.

Paper Diffuse Brightness, CIE Whiteness, and Color Properties Determination—This method describes a procedure for determining the diffuse brightness, CIE whiteness, and the Hunter yellowness index and L, a, b values of the paper. The Technibrite Micro TB-1C tester (manufactured by Technidyne Corporation, New Albany, Ind. 47150 USA) was used. This instrument employs diffuse illumination geometry.

Select the brightness CIE whiteness, Hunter yellowness index and L, a, b color from the menu programmed in the instrument.

Paper specimens are conditioned for 24 hours at 72° F. and 50% relative humidity. Place a sample pad of test specimens over the specimen aperture of the instrument with the side to be measured face up when in contact with the aperture of instrument. Secure the pad with the spring-loaded pedestal. The pad should be completely opaque. The number of sheets in the pad should be such that doubling the thickness does not change the measurement. Follow the sequence of steps outlined in the instrument operations manual that is supplied with the instrument to collect the measurements.

Move the lower paper sample sheet to the back of the pad. Measure 9 different locations on each sheet, with 3 locations each equidistant across the top, middle, and bottom. Repeat this procedure until 3 sheets have been measured. The instrument provides instantaneous calculation of mean average of the CIE whiteness, Hunter yellowness index and L, a, b optical properties.

Décor Paper Saturation and Lamination—A solution of melamine resin was prepared by slowly adding 550 grams of Maduit MW 550 resin into 500 ml of water at 40-50° C. so that no lumps are formed, and mixed to a clear solution. Then 1.8 ml of Hypersal XT 7933 and 2.3 ml Hardener MH835 were added. (This solution must be used within 4 hours after preparation).

The lab prepared papers were cut into pieces measuring 15 cm×8 cm (5.9×3.1 inches). The solution was placed into a pan sized so that the paper samples (one sheet at a time) could be totally immersed into the melamine resin solution. The papers were immersed for 45 seconds such that both sides of the paper were in contact with the solution. The saturated papers were removed from the bath and passed between 2 number 0.8 rods to remove the excess solution. The papers were attached to an open frame and dried in a forced hot air oven for 3 minutes. The frame is necessary so that the paper maintains its shape during the drying process.

The saturated papers were cut to a size appropriate to the size of the panels that we wanted to produce. (The size is not important). Half of each saturated paper was placed over a white sheet of backing paper and half over a standard black backing paper. These were then placed atop five saturated standard brown paper layers, and one saturated standard white layer. All of these were pressed together for 2.5 minutes between two metal plates at a pressure of 800 N/cm$^2$ and temperature of 150° C. The pressure was released but before the plates were separated the samples were then cooled to around 100° C.

After the papers were saturated and laminated into panels they were tested for Hunter L, a and b color values.

Saturated and Laminated Paper Contrast Ratio Determination—This method describes a procedure for determining the ISO brightness, CIE whiteness, Hunter L, a, b values, and contrast ratio of decorative papers that have been saturated with resin and laminated onto a rigid substrate. The optical properties of the saturated and laminated papers are measured by a Color Touch Spectrophotometer (manufactured by Technidyne Corporation, New Albany, Ind. 47150 USA). The spectrophotometer uses diffuse illumination geometry.

Select the ISO brightness, CIE whiteness and Hunter L, a, b color tests from the menu listed on the touch screen of the instrument. Place the saturated and laminated specimen over the aperture of the instrument with the side to be measured face up when in contact with the aperture of instrument. Secure the specimen with the spring-mounted pedestal. Follow the sequence of steps outlined in the instrument operation manual to obtain the selected optical properties.

Contrast ratio is determined by dividing the reflectance of a sheet backed by black by the reflectance value of a sheet backed by white. For these measurements the reflectance values are obtained under C/2° illuminant and C source conditions. The test parameters are selected from the menu listed on the touch screen of the instrument. Place the saturated and laminated specimen over the aperture of the instrument with the side to be measured face up when in contact with the aperture of instrument. Secure the specimen with the spring-mounted pedestal. Follow the sequence of steps outlined in the instrument operation manual to obtain the selected optical properties.

For the above described optical tests 3 different locations on each specimen are measured, each equidistant across the middle. Repeat this procedure with each sample. The results are reported as the arithmetic mean average for each sample.

In order to assess the ability of the paper to hide a substrate having poor brightness and color, optical properties were measured over the white as well as over the black background. The results in Table 3 are reported as the change in property compared to the Control which was 100% rutile titanium dioxide. The formula used was (Property of Paper Containing Experimental Pigment)-(Property of Paper containing the 100% rutile).

The following examples illustrate the present invention and its utility in the white high pressure laminated décor papers that have the most demanding requirements. Unless otherwise indicated in the following examples and elsewhere in the specification and claims, all parts and percentages are by weight, all temperatures are in degrees Centigrade, and pressure is at or near atmospheric pressure. In the following test methods the instruments are calibrated with appropriate standard supplied with the instrument, and in accordance with the manufacturer's instructions.

Inventive Example 1

Well-dispersed slurry of hydrous kaolin was blended with well-dispersed slurry of anatase or rutile titanium dioxide. Preparation A is a commercial product. In Preparations B, C. D, E, and F, the hydrous kaolin was ULTRA COTE™ kaolin from Engelhard Corporation. The amounts of kaolin and the amounts and type of titanium dioxide used are listed in the following Table 1. The blend was spray dried to a free moisture of about 1%, pulverized to break-up the microspheres, heated at the temperatures indicated in Table 1, and post pulverized to break up the large agglomerates. The dehydroxylated kaolin in the resulting heated mixture was metakaolin. The TAPPI brightness, Hunter L, a, b values, and Hunter yellowness index were measured as previously described for each resulting pigment and are reported in Table 1.

Paper was made using as fillers Preparations A, C, D, E, F and also included was a Control which was a typical rutile titanium dioxide used in décor papers. The paper properties are listed in Table 2.

The ash content of paper was first determined by igniting the paper in a laboratory muffle furnace at 982° C. for 3 hours using 2 grams of paper. The net mineral content of the paper is determined by subtracting the ash of a non-filled sheet from the ash of a pigment filled sheet and dividing the result by the ignition factor of the pigment. The ignition factor of the pigment is 100 minus the loss on ignition value of the same pigment. The net mineral content of paper is expressed as a percentage of paper that is comprised by the pigment.

In Table 2, the net mineral content is the amount of pigment retained in the sheet of paper. The control pigment system is 100% rutile titanium dioxide. The column labeled as "TiO$_2$ Replacement" represents the level of rutile titanium dioxide replaced by the Preparation indicated. The Control made from Prep A is representative of a commercially available product.

The paper samples were then saturated and laminated as previously described. The test results are reported in Table 3.

TABLE 1

|  | Prep. A | Prep. B | Prep. C | Prep. D | Prep. E | Prep. F |
|---|---|---|---|---|---|---|
| Ratio: % Hydrous kaolin/% $TiO_2$ | 89.5/10.5 | 89.5/10.5 | 92.5/7.5 | 89.5/10.5 | 85/15 | 80/20 |
| Hydrous Kaolin Feed | Standard | Ultra Cote | Ultra Cote | Ultra Cote | Ultra Cote | Ultra Cote |
| Type $TiO_2$ | Rutile | Rutile | Anatase | Anatase | Anatase | Anatase |
| Heating Temp ° C. |  |  | 870 |  |  |  |
| GE Brightness (%) | 81.3 | 84.6 | 90.0 | 89.7 | 89.2 | 89.0 |
| Hunter |  |  |  |  |  |  |
| L | 94.69 | 95.07 | 96.82 | 96.69 | 96.75 | 96.76 |
| A | −0.73 | −0.86 | −0.69 | −0.37 | −0.65 | −0.55 |
| B | 7.69 | 6.06 | 4.08 | 4.21 | 4.36 | 4.36 |
| Hunter Yellowness Index | 11.60 | 9.10 | 6.03 | 6.22 | 6.44 | 6.44 |

Preparations A and B contain rutile with standard brightness and high brightness kaolin's respectively and did not achieve the desired brightness level of above 89% and they also had the poorest whiteness and yellowness indexes. To achieve the highest pigment brightness and best color values it appears that the combination of anatase and high brightness kaolin is necessary. These properties are beneficial in décor papers, especially the white grades where high whiteness and brightness as well as high opacity are desired.

The black glass scattering coefficient of an inventive sample similar to Preparation E is 0.360 $m^2$/g at 457 nm. This represents an improvement over the commercially available calcined kaolin referenced previously.

Preparation A and comparable in performance to the rutile Control in brightness and color. These results are surprising since the refractive index of the rutile Control is superior to that of the Preparations C through F. It is also significant after replacing 25% of the rutile Preparations C through F had optical properties equivalent to the rutile Control. Considering that anatase titanium dioxide and that other kaolin-based products have lower refractive index than rutile titanium dioxide, it was surprising and unexpected that the opacity of the décor paper made with the inventive pigments remained comparable to that of décor paper filled with 100% rutile titanium dioxide even when replacing 25% of the rutile $TiO_2$.

TABLE 2

Optical Properties of Paper Samples

| Heated Mixture | $TiO_2$ Replacement (%) | Net Mineral Content (%) | Basis Wt. (g/$m^2$) | Brightness (%) | Hunter "dL' Value | Hunter "da" value | Hunter "db" Value | CIE Whiteness | Hunter Yellowness Index | Opacity (%) |
|---|---|---|---|---|---|---|---|---|---|---|
| Control 100% $TiO_2$ Rutile | 0.0 | 39.04 | 80.0 | 90.0 | 96.2 | −0.75 | 3.11 | 78.62 | 4.62 | 97.2 |
| Control (Prep. A) | 10.0 | 40.39 | 79.5 | 89.3 | 96.0 | −0.68 | 3.41 | 77.0 | 5.07 | 97.7 |
|  | 17.5 | 38.23 | 79.8 | 89.1 | 96.1 | −0.65 | 3.46 | 76.8 | 5.15 | 97.9 |
|  | 25.0 | 42.34 | 80.9 | 88.1 | 95.8 | −0.63 | 3.81 | 74.7 | 5.69 | 98.3 |
| Prep. C | 10.0 | 40.30 | 80.3 | 89.9 | 96.2 | −0.75 | 3.20 | 78.3 | 4.75 | 97.5 |
|  | 17.5 | 38.83 | 79.4 | 90.3 | 96.4 | −0.71 | 3.15 | 78.8 | 4.67 | 97.4 |
|  | 25.0 | 39.19 | 80.0 | 90.3 | 96.5 | −0.69 | 3.22 | 78.8 | 4.76 | 97.7 |
| Prep. D | 10.0 | 38.95 | 79.5 | 90.0 | 96.1 | −0.72 | 3.04 | 78.8 | 4.52 | 97.5 |
|  | 17.5 | 38.66 | 79.5 | 90.2 | 96.4 | −0.69 | 3.18 | 78.8 | 4.71 | 97.5 |
|  | 25.0 | 38.07 | 79.5 | 90.1 | 96.4 | −0.69 | 3.27 | 78.4 | 4.84 | 97.6 |
| Prep. E | 10.0 | 42.96 | 79.6 | 89.9 | 96.3 | −0.71 | 3.24 | 78.2 | 4.81 | 97.5 |
|  | 17.5 | 39.35 | 79.8 | 89.9 | 96.4 | −0.68 | 3.22 | 78.5 | 4.78 | 97.6 |
|  | 25.0 | 39.85 | 80.1 | 89.8 | 96.4 | −0.67 | 3.34 | 78.0 | 4.96 | 97.7 |
| Prep. F | 10.0 | 41.17 | 79.4 | 90.0 | 96.2 | −0.69 | 3.19 | 78.4 | 4.74 | 97.5 |
|  | 17.5 | 38.35 | 79.2 | 90.1 | 96.4 | −0.67 | 3.20 | 78.6 | 4.75 | 97.5 |
|  | 25.0 | 37.92 | 79.4 | 89.9 | 96.4 | −0.64 | 3.31 | 78.2 | 4.91 | 97.7 |

The use of the Control product in decorative laminates has been limited because it has poor whiteness, high yellowness and poor brightness although it has marginally superior opacity. The results in Table 2 show that paper made with Preparations C through F are superior to the Control made from It is believed that the temperature used in the heating process alters the crystalline structure of the clay and causes the metal oxide to aggregate with the altered clay making the resultant product more optically efficient than otherwise expected from its nominal refractive index.

TABLE 3

Optical Properties of Paper Samples After Impregnation and
High Pressure Lamination (Delta change over 100% TiO₂)

| Background | TiO₂ Replacement (%) | Hunter "dL" Value Over White | Hunter "dL" Value Over Black | Hunter "da" Value Over White | Hunter "da" Value Over Black | Hunter "db" Value Over White | Hunter "db" Value Over Black | CIE Whiteness White | Contrast Ratio @577 nm (%) (1) |
|---|---|---|---|---|---|---|---|---|---|
| Control (Prep. A) | 10 | −0.59 | 0.26 | 0.15 | 0.06 | 0.54 | 0.23 | −2.5 | 93.0 |
| | 17.5 | 0.02 | 1.01 | 0.24 | 0.11 | 1.00 | 1.05 | −2.8 | 93.5 |
| | 25 | −0.03 | 0.68 | 0.26 | 0.07 | 1.57 | 1.16 | −6.6 | 93.5 |
| Prep. C | 10 | −0.08 | −0.09 | 0.08 | 0.03 | 0.21 | −0.03 | −1.2 | 92.3 |
| | 17.5 | −0.05 | 0.82 | 0.06 | 0.06 | 0.24 | 0.19 | −0.1 | 92.1 |
| | 25 | 0.12 | 0.93 | 0.13 | 0.10 | 0.35 | 0.21 | 0.2 | 92.7 |
| Prep. D | 10 | −0.20 | −0.19 | 0.05 | 0.06 | −0.19 | −0.27 | 0.0 | 92.5 |
| | 17.5 | 0.13 | 1.08 | 0.07 | 0.07 | 0.22 | 0.19 | 0.3 | 92.7 |
| | 25 | 0.28 | 0.56 | 0.11 | 0.12 | 0.34 | 0.22 | −0.1 | 92.6 |
| Prep. E | 10 | −0.16 | 0.26 | 0.07 | 0.04 | 0.15 | −0.17 | −0.5 | 92.5 |
| | 17.5 | 0.67 | 1.03 | 0.13 | 0.06 | 0.40 | 0.15 | 0.0 | 92.3 |
| | 25 | 0.50 | 0.73 | 0.16 | 0.09 | 0.56 | 0.19 | −0.5 | 92.6 |
| Prep. F | 10 | −0.24 | 0.27 | 0.10 | 0.04 | 0.23 | −0.02 | −0.7 | 92.7 |
| | 17.5 | 0.10 | 1.08 | 0.08 | 0.01 | 0.33 | 0.21 | 0.0 | 92.0 |
| | 25 | −0.12 | 0.28 | 0.17 | 0.09 | 0.35 | 0.18 | −0.4 | 92.3 |

(1) Represents the reflectance over black divided by reflectance over white- Rutile value is 92%

The results indicate that the Control from Preparation A has superior contrast ratio over the other preparations and the rutile Control at replacement ratios up to 25%. However the lower brightness and whiteness and higher yellowness index have a significant negative impact on the performance of paper containing Preparation A. Preparations C through F have performance properties equal to or marginally different to the rutile Control and offer the producer of the decorative paper the opportunity to replace higher levels of the more expensive rutile.

Considering that anatase titanium dioxide and that other kaolin-based products have a lower refractive index than rutile titanium dioxide, it was surprising and unexpected that the optical properties of the inventive samples were comparable to the Control paper filled with 100% rutile titanium dioxide, even after being saturated and subjected to elevated temperatures and pressures during lamination. Even at replacement levels of up to 25% of the rutile titanium dioxide properties remained comparable to that of the Control.

Inventive Example 2

Another set of filled papers was made using the procedures described earlier. These papers were filled with pigments described as Preparations A, C, D, E, F and a rutile titanium dioxide Control. These sheets had a basis weight of about 80 g/m² and contained about 40% total pigment content. The levels of the titanium dioxide replaced were as high as 100% for some of the Preparations (those containing the higher amounts of anatase). These papers were saturated and laminated and tested. The results are listed in Table 4.

TABLE 4

| Sample I.D. | TiO₂ Replacement | Diffuse Brightness (%) | Hunter L | Hunter a | Hunter b | Contrast Ratio |
|---|---|---|---|---|---|---|
| Control 100% TiO2 Rutile | 0% | 73.7 | 87.3 | −1.3 | 2.3 | 92.2 |
| Prep. A | 20% | 71.9 | 87.2 | −1.26 | 3.54 | 93.5 |
| | 40% | 70.0 | 86.9 | −1.30 | 4.78 | 94.1 |

TABLE 4-continued

| Sample I.D. | TiO₂ Replacement | Diffuse Brightness (%) | Hunter L | Hunter a | Hunter b | Contrast Ratio |
|---|---|---|---|---|---|---|
| Prep. C | 40% | 73.9 | 87.8 | −1.31 | 2.81 | 93.3 |
| Prep. D | 20% | 74.0 | 87.8 | −1.25 | 2.67 | 92.7 |
| | 40% | 73.3 | 87.5 | −1.30 | 2.88 | 92.4 |
| Prep. E | 20% | 73.2 | 87.4 | −1.34 | 2.71 | 93.0 |
| | 40% | 73.3 | 87.6 | −1.37 | 3.05 | 92.6 |
| | 60% | 71.6 | 86.9 | −1.42 | 3.40 | 92.9 |
| | 80% | 68.8 | 85.3 | −1.62 | 3.53 | 87.5 |
| | 100% | 64.3 | 83.2 | −1.88 | 4.42 | 77.3 |
| Prep. F | 20% | 73.8 | 87.6 | −1.28 | 2.56 | 93.1 |
| | 40% | 73.2 | 87.4 | −1.33 | 2.82 | 92.1 |
| | 60% | 71.9 | 86.9 | −1.43 | 3.16 | 91.6 |
| | 80% | 69.3 | 85.7 | −1.64 | 3.71 | 88.3 |
| | 100% | 63.5 | 82.4 | −1.95 | 4.05 | 68.2 |

The results in Table 4 are on papers that have been saturated and laminated only. With Preparation A (commercial product) the contrast ratio (opacity) is superior to the Control with 100% rutile however the brightness is poorer as is the whiteness (CIE and L value) and yellowness (as indicative of the high b value). Preparations C through F are significantly better in brightness and color that Preparation A. The results also demonstrate that there may be a limit to the amount of titanium substitution possible. The highest substitution possible was with Preparations E and F which contain the highest levels of anatase. In the high pressure laminated (HPL) white grades of décor papers that have the most difficult requirements, the titanium dioxide substitution might be up to about 20% or even as high as to about 40%. In off-white papers, color papers, low pressure laminates and in pre-impregnated paper where the requirements are less demanding, the levels of titanium dioxide substitution might be as high as about 40% or even as high as to about 60%.

Inventive Example 3

A sample of heated mixture was prepared using Lithopone (ZnS/BaSO₄), Grade DA from Sachtleben Chemie GmbH and standard fine particle size kaolin having a brightness of about 83%. The lithopone was subjected to wet ball milling at 40% solids for approximately 14 hours. The fine kaolin was slowly added as slurry to the lithopone slurry under moderate agitation to ensure good dispersion. The amounts of these two pigments were such that the final pre-heated mix contained 90% of the fine kaolin and 10% of lithopone. This mixture was spray dried and pulverized through a Fitzmill three times through a 0.020 screen then heated at 1090° C. for 1 hour in a muffle furnace. The resultant particle size was 90%<10 microns, 50%<2 microns and 2%<3 microns. This sample is referred to as Preparation G.

Paper was made using the procedures described earlier with the following fillers (a) 100% rutile titanium dioxide typically used in décor papers and (b) 20% of the heated mixture of Inventive 3 and 80% of the titanium dioxide Control used in (a). The basis weight of these papers was about 80 g/m², and the net mineral content was about 40%. The optical properties of these papers before and after saturation and lamination are recorded in Tables 5 and 6 respectively.

TABLE 5

| | TiO₂ Replacement (%) | GE Brightness (%) | Opacity (%) | Hunter | | |
|---|---|---|---|---|---|---|
| | | | | L | a | B |
| Control 100% TiO2 Rutile | 0 | 90.3 | 97.6 | 96.4 | −0.68 | 3.03 |
| Preparation G | 20 | 90.2 | 97.9 | 96.6 | −0.67 | 3.23 |

TABLE 6

| | TiO2 Replacement Level (%) | ISO Brightness (%) | | Hunter | | | | | | Contrast Ratio (%) |
|---|---|---|---|---|---|---|---|---|---|---|
| | | | | L | | a | | b | | |
| | | Black | White | Black | White | Black | White | Black | White | |
| Control 100% TiO2 Rutile | 0 | 70.4 | 74.3 | 84.1 | 87.9 | −1.32 | −1.29 | 0.48 | 2.62 | 94.9 |
| Preparation G | 20 | 70.1 | 74.1 | 84.2 | 88.3 | −1.33 | −1.36 | 0.81 | 3.39 | 94.7 |

After saturation and lamination, the results in Table 6 show the brightness, contrast ratio, L and a values over black and white are comparable to the Control. However the b value over the white indicates that the paper with Preparation G may be slightly less blue that desired in the white grades. However in the less demanding grades up to about 20% replacement may be possible.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A heated mixture comprising:
   (a) from about 1% to about 46% by weight of lithopone having a refractive index greater than 1.8; and
   (b) from about 54% to about 99% by weight of a dehydroxylated kaolin, wherein when the dehydroxylated kaolin comprises metakaolin, the heated mixture has a GE brightness equal to or greater than 90% and a Hunter yellowness index of less than about 11, and when the dehydroxylated kaolin comprises fully calcined kaolin, the heated mixture has a GE brightness greater than 90% and a Hunter yellowness index of less than about 7,
   wherein said heated mixture is formed by mixing hydrous kaolin having a GE brightness of about 88 or more and a refractive index from about 1.56 to about 1.58, and the high refractive index pigment, and heating at a temperature from about 760° C. to about 1150° C., and
   the heated mixture has a particle size distribution where at least about 80% to about 90% by weight of the particles have a particle size of about 2 microns or less and less than about 5% by weight of the particles have a particle size of about 0.2 micron.

2. The heated mixture of claim 1 wherein said (b) dehydroxylated kaolin comprises said metakaolin.

3. The heated mixture of claim 1 wherein said (b) dehydroxylated kaolin comprises said fully calcined kaolin.

4. The heated mixture of claim 1 wherein said (b) dehydroxylated kaolin comprises said mixture of metakaolin and fully calcined kaolin.

5. A pigment system comprising said heated mixture of claim 1 and at least one of rutile titanium dioxide and anatase titanium dioxide.

6. A high performance pigment system comprising from about 1% to about 60% by weight of said heated mixture of claim 1 and from about 40% to about 99% by weight of at least one of rutile titanium dioxide and anatase titanium dioxide.

7. Paper comprising fiber and said heated mixture of claim 1.

8. Paper comprising fiber and said high performance pigment system of claim 6.

9. The heated mixture of claim 1 wherein said hydrous kaolin has a GE brightness of about 90 or more.

10. A pigment system comprising from about 1% to about 60% by weight of said heated mixture of claim 1 and from about 40% to about 99% by weight of rutile titanium dioxide, the rutile titanium dioxide comprising a silica coating on the surface of the rutile titanium dioxide where the silica coating is less than about 10% by weight of the rutile titanium dioxide.

11. A pigment system comprising from about 1% to about 60% by weight of said heated mixture of claim 1 and from about 40% to about 99% by weight of rutile titanium dioxide, the rutile titanium dioxide comprising an alumina coating on the surface of the rutile titanium dioxide.

12. A pigment system comprising from about 1% to about 60% by weight of said heated mixture of claim 1 and from about 40% to about 99% by weight of rutile titanium dioxide, the rutile titanium dioxide comprising a silica and alumina coating on the surface of the rutile titanium dioxide.

13. A heated mixture comprising:
(a) from about 1% to about 46% by weight of anatase titanium dioxide having a refractive index greater than 1.8; and
(b) from about 54% to about 99% by weight of a dehydroxylated kaolin, wherein when the dehydroxylated kaolin comprises metakaolin, the heated mixture has a GE brightness equal to or greater than 90% and a Hunter yellowness index of less than about 11, and when the dehydroxylated kaolin comprises fully calcined kaolin, the heated mixture has a GE brightness greater than 90% and a Hunter yellowness index of less than about 7,
wherein said heated mixture is formed by mixing hydrous kaolin having a GE brightness of about 88 or more and a refractive index from about 1.56 to about 1.58, and the high refractive index pigment, and heating at a temperature from about 760° C. to about 1150° C., and
the heated mixture has a particle size distribution where at least about 80% to about 90% by weight of the particles have a particle size of about 2 microns or less and less than about 5% by weight of the particles have a particle size of about 0.2 micron.

14. The heated mixture of claim 13 wherein said dehydroxylated kaolin comprises a mixture of metakaolin and fully calcined kaolin.

15. A pigment system comprising said heated mixture of claim 13 and at least one of rutile titanium dioxide and anatase titanium dioxide.

16. A high performance pigment system comprising from about 1% to about 60% by weight of said heated mixture of claim 13 and from about 40% to about 99% by weight of at least one of rutile titanium dioxide and anatase titanium dioxide.

17. Paper comprising fiber and said heated mixture of claim 13.

18. A pigment system comprising from about 1% to about 60% by weight of said heated mixture of claim 13 and from about 40% to about 99% by weight of rutile titanium dioxide, the rutile titanium dioxide comprising a silica coating on the surface of the rutile titanium dioxide where the silica coating is less than about 10% by weight of the rutile titanium dioxide.

19. A pigment system comprising from about 1% to about 60% by weight of said heated mixture of claim 13 and from about 40% to about 99% by weight of rutile titanium dioxide, the rutile titanium dioxide comprising an alumina coating on the surface of the rutile titanium dioxide.

20. A pigment system comprising from about 1% to about 60% by weight of said heated mixture of claim 13 and from about 40% to about 99% by weight of rutile titanium dioxide, the rutile titanium dioxide comprising a silica and alumina coating on the surface of the rutile titanium dioxide.

* * * * *